United States Patent [19]

Lefevre et al.

[11] Patent Number: 5,163,112
[45] Date of Patent: Nov. 10, 1992

[54] REMOTE FIBER OPTIC ELECTRICAL SWITCH

[75] Inventors: Donald K. Lefevre; Daniel J. Mulally, both of Rapid City, S. Dak.

[73] Assignee: Wireless Control Systems, Inc., Rapid City, S. Dak.

[21] Appl. No.: 818,343

[22] Filed: Jan. 9, 1992

[51] Int. Cl.$^5$ .......................... G02B 6/32; G02B 6/34
[52] U.S. Cl. .................................. 385/19; 250/227.23
[58] Field of Search ..................... 385/12, 13, 18, 19; 250/227.23, 485.1

[56] References Cited

U.S. PATENT DOCUMENTS

| | | | |
|---|---|---|---|
| 4,569,569 | 2/1986 | Stewart | 385/33 X |
| 4,704,656 | 11/1987 | Neiger | 361/173 |
| 4,705,348 | 11/1987 | Matsunaga | 385/18 |
| 5,046,806 | 9/1991 | Kidder et al. | 385/16 |

*Primary Examiner*—Akm E. Ullah
*Attorney, Agent, or Firm*—Frank D. Gilliam

[57] ABSTRACT

A remote switch system for controlling electrical devices, such as electrical lights, from a remote switch location using a single optical fiber to communicate the controlling signal from the remote switch to the device. Typically, the remote switch may be added to a normal switch near the device during modification or remodeling of a building, automobile or the like or installed in during original construction. The fiber optic system includes both an emitter and a detector at the first end of a fiber optic. The emitter sends a light signal through the fiber and the detector detects a reflected signal coming back through the fiber. Conventional switching circuits or relays turn the electrical device, e.g. a light, to a different state, such as "on" or "off" in response to a pulse of light or the presence or absence of a returning signal. The remote switch is located at the second end of the fiber and includes means for moving a retroreflector, preferably a sheet having a large number of very small, closely spaced, cube corner or spherical lens retroreflectors, past or into and out of an operative position relative to the fiber end. Thus, the switch can be used in a pulsed or a continuous reflection mode. Since the fiber is very small, it can be simply taped to wall surfaces and painted over, eliminating the need to feed wires through the wall. Additional remote switches may be added as needed simply and at little expense. Safety is enhanced, since no wires carrying electrical current extend to the remote switch.

25 Claims, 1 Drawing Sheet

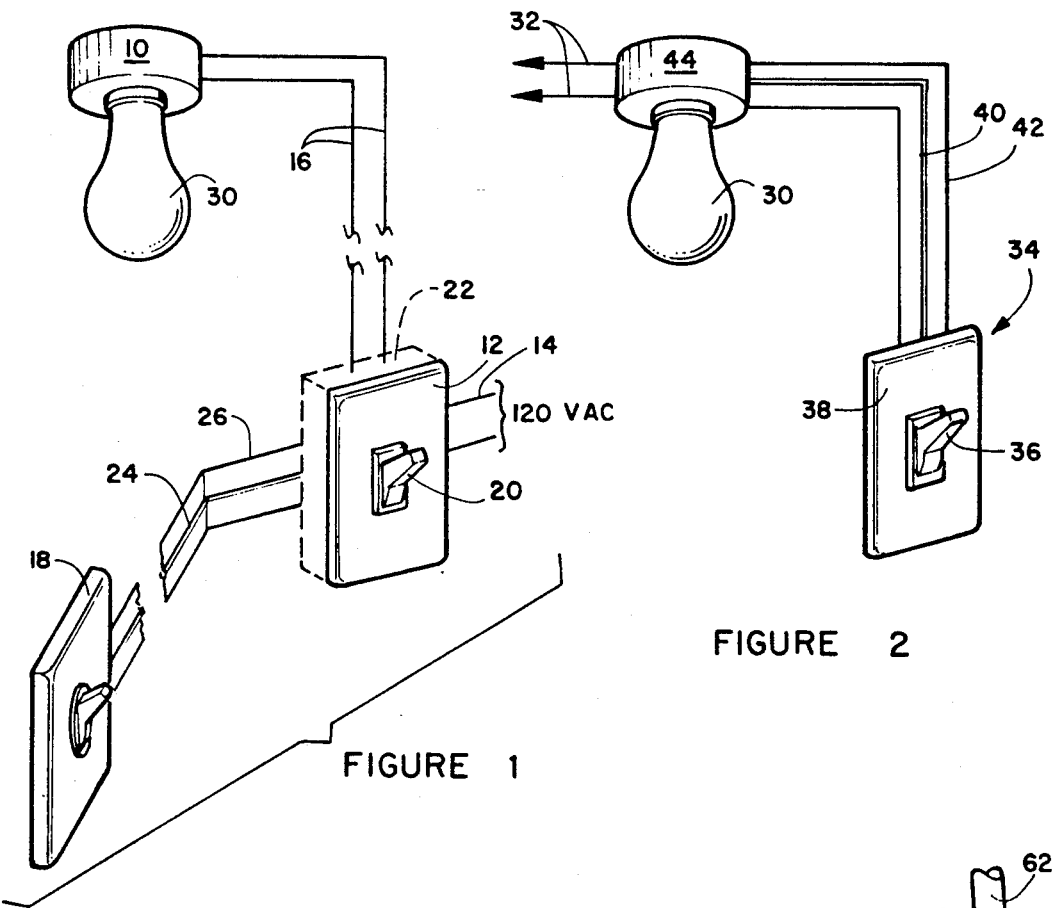
FIGURE 1
FIGURE 2
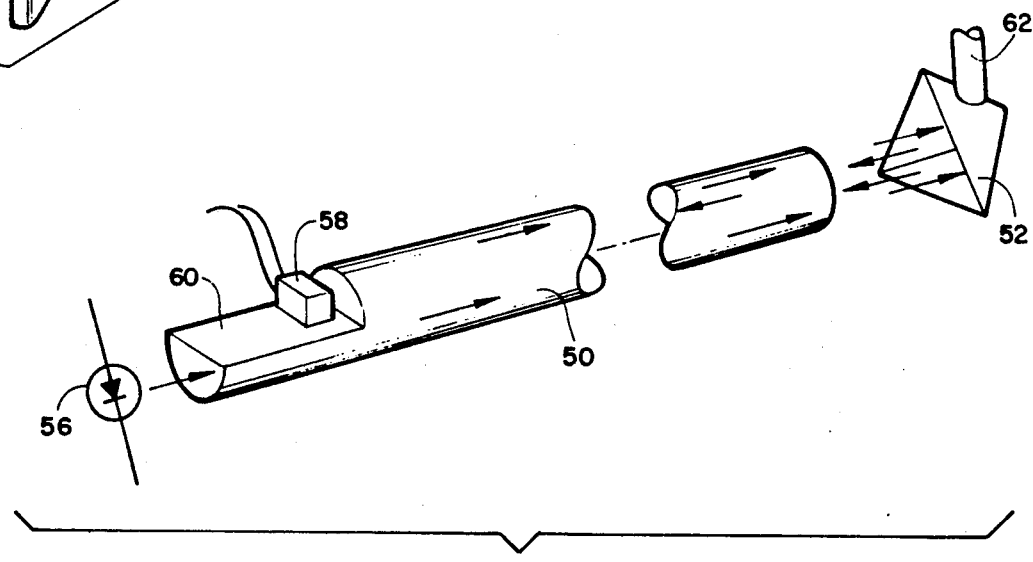
FIGURE 3

REMOTE FIBER OPTIC ELECTRICAL SWITCH

BACKGROUND OF THE INVENTION

This invention relates in general to electrical switches and, more specifically, to a remote switching system using a single fiber optic to carry the switching signal.

Conventionally, switches having at least two insulated metal wires are used to connect switches to electrical devices, such as lights, motors, fans, heaters or the like, to allow the device to be turned on and off.

In new construction, the wires are extended through walls, requiring cutting holes through studs, and threading the wires therethrough. There is always a danger that someone, during construction or later, may insert screws or nails into the wall, drill holes, etc. and contact the wires, resulting in a shock and fire hazard. Also, conventional electrical switches present a shock hazard in wet environments, such as laundry areas, bathrooms, kitchens and outdoors. Since there is a small arc in most switches, they also present a hazard in explosive environments such as industrial sites and areas where oxygen is used, such as in hospitals.

In remodeling of rooms or adding new electrical devices, adding switches with insulated metal wires between the new switches and devices is expensive and difficult, requiring fishing wires through existing, covered, walls. In some cases, switches are desired on thin partition walls or solid masonry walls where the wiring cannot be hidden. The use of surface mounted wires or loose extension cords is both visually undesirable and a safety hazard.

Attempts have been made to use thin wires taped to the wall for remote switches. However, because of the required insulation and required wire diameter, the surface mounted wires are very apparent and unattractive. Also, the wires are subject to damage, such as during moving of furniture, resulting in both an electrical shock and fire hazard.

Recently, a number of small hand-held remote controls using a radio frequency or infrared signal sent to a receiver at the device to be controlled have been developed. These are very effective in a number of applications, such as the control of audio or video entertainment equipment. They are, however, less successful in applications such as the control of room lights and similar permanent devices. Generally, these remote controls require a receiver mounted at the device, such as at an electrical outlet between a lamp plug and the outlet. These senders and receivers tend to be expensive and prevent the normal lamp switch from being used. Also, the senders are easily misplaced. These remote control devices are not usable with general room lighting controlled by a wall switch or in similar applications.

In an effort to overcome these problems with remote electrical switches using metal, current carrying, wiring, the use of fiber optics has been proposed. Speers, in U.S. Pat. No. 4,023,887 discloses complex switching systems using cables each made up of a plurality of parallel optical fibers to carry various signals. While these cables may be laminated to walls, it is apparent that the size of the cables will result in obvious, obtrusive strips across the wall, since at least two optical fibers are needed between each switch and controlled device. Similarly, Matsunaga et al, in U.S. Pat. No. 4,705,348 discloses an optical switch using two optical fibers between a complex switch and the device being controlled. The reflector used by Matsunaga et al would require very precise alignment of the fiber ends and the reflector and careful orientation and polishing of the fiber ends to be certain that sufficient light entering from one fiber is reflected into the other.

Others, such as Narondy in U.S. Pat. No. 3,886,544 and Ho et al in U.S. Pat. No. 4,797,549 simply interpose a blocking or reflecting member into a break in two optical fibers to selectively block or permit light passage. These techniques require highly polished fiber ends, cut precisely 90° to the fiber axis and careful alignment of the fiber ends to allow sufficient transfer of light from one fiber to the other.

Thus, there is a continuing need for improved systems for switching electrical devices on and off, which eliminate the problems with metal electrical wiring between switch and device, have greater reliability and simplicity than prior non-wired systems and permit easy and unobtrusive addition of remote switches to existing construction.

SUMMARY OF THE INVENTION

It is, therefore, an object of this invention to provide a remote electrical switch system overcoming the above noted problems. Another object is to provide a remote switching system having no electrical connection to the remote switch. A further object is to provide a remote switching system adapted to easy installation with all connections unobtrusively surface mounted on intervening walls. A further object is to provide a remote switch that does not require electrical power at the switch.

The above-noted objects, and others, are accomplished in accordance with this invention, which basically comprises a single optical fiber extending from the location of an electrical device which is to be switched between "on" and "off" states (or other variable states), an emitter at the device location for directing light into the fiber, a detector at the device location for receiving light from the fiber, means to selectively reflect light back into the fiber at the remote switch location and means at the device to change the state of the device in response to the receipt of pulses of light (or the presence or interruption in light) at the detector. For the purposes of this application, "single fiber optic" includes both a single fiber strand and a single bundle of such fiber strands.

Typically, the electrical device being controlled may be an electrical light such as ceiling lights controlled by a wall switch, wall mounted electrical heaters, ceiling fans controlled by wall switches, appliances or the like. The remote fiber optic switch of this invention may be directly connected to the device being controlled, as would be usual in new construction or it may be connected to a conventional wall switch, as would be usual in remodeling or modification of existing structures.

While a single, very thin optical fiber is preferred, a very thin bundle of substantially parallel very thin fibers could be used if desired. In either case, the emitter light signal passing in one direction and the signal to the detector passing in the other will pass through the fibers. This dual use will permit the fiber to be extremely thin, much thinner than would be possible with a bundle in which different fibers carry each signal. This will both decrease the cost of the fibers and make installation simpler. For best results where the fiber or bundle is to be surface mounted on a wall with tape, the fiber or bundle should have a diameter of from about 0.003 to 0.03 inch, although a fiber bundle diameter of up to about 0.1 could be used, if greater visibility is acceptable.

The optical fiber can be easily installed by taping the fiber to the wall or other surface between the remote location and the device being controlled, then painting over the tape. Preferably a self-adhesive tape with the fiber coaxial with the tape is preferred. The painted tape with the very thin optical fiber will be very unobtrusive, generally nearly invisible.

BRIEF DESCRIPTION OF THE DRAWING

Details of the invention, and of certain preferred embodiments thereof, will be further understood upon reference to the drawing, wherein:

FIG. 1 is a schematic perspective view of the system of this invention connected to an existing electrical switch arrangement;

FIG. 2 is a schematic perspective view of the system of this invention connected directly to the device being controlled; and FIG. 3 is a schematic detail perspective view showing the optical fiber end connections.

DETAILED DESCRIPTION OF PREFERRED EMBODIMENTS

Referring now to FIG. 1, there is seen a schematic representation of a wall switch added on to an existing system. A light 10, typically a built-in ceiling light, was originally wired to be operated by a conventional switch 12, using 120 volt line 14 and conventional insulated copper wires 16 running within the wall. It is now desired to add a second wall switch 18 at a different location. Optionally, switch 12 may still be used, with switches 12 and 18 each operable in the manner of conventional three-way switches, or switch 18 could entirely replace switch 12 which might, for example, have the front plate and switch actuator 20 removed and the switch location covered, such as by wood paneling.

To install a conventional switch at switch 18 would be difficult, expensive and beyond the ability of most do-it-yourself homeowners. Conventional wiring would require the installation of an insulated copper conductor cable within the wall between switches 12 and 18. A cable within the wall has some danger, since if during other remodeling nails are hammered into the wall or holes are drilled into the wall a shock or fire hazard could result. Attempting to run a metal wire cable between the switches along the outer surface of the wall would be unattractive and dangerous. Shock hazards are also present where conventional electrical switches are used in wet or high humidity environments, such as kitchens, bathrooms or outdoor locations. Most conventional electrical switches cannot be used in explosive environments, such as industrial locations or patient bed headboards where oxygen is present.

Instead, in accordance with this invention, a light emitter and detector system, as described below, is placed in the junction box 22 behind switch 12, with a very thin optical fiber 24 extending along the wall surface to switch 18, covered by a thin self-adhesive, paintable tape 26.

Optical fiber 24 is very thin, preferably having a diameter of from about 0.003 to 0.10 inch, so that the fiber 24 and tape 26 will very unobtrusive, in fact nearly invisible, when painted over to blend with the wall paint. Any suitable optical fiber may be used, either plastic or glass core fibers. While a single fiber is preferred for maximum performance at very small diameters, a very thin fiber bundle may be used, if desired. As detailed below, maximum fiber efficiency is achieved since all of the light signals passing in both directions pass through the same fiber or small bundle. Typical fibers that may be used are available from Mitsubishi, Poly-Optic Products, Amoco, Gould, Hewlett-Packard and others. Any suitable paper or plastic tape may be used that is easily and permanently affixed to the wall, has a smooth texture and is paintable with conventional paints.

Switch 18 is any simple switch capable of moving a reflector (as detailed below) past or into and out of a cooperating relationship with the end of fiber optic 24. Typically, this can be a two-position switch moving a reflector past a position in line with the end of the fiber, creating a pulse of light, or between a first position aligned with the end of the fiber and a second out of alignment. Similarly, a slide switch mounting the reflector or a lever switch of the sort seen at switch 12 could be used. Other types of switches, such as rotary or push button switches could be used, as desired.

In the most preferred embodiment, the reflector is a retroreflector moved past the end of fiber optic 24 from one side to the other or into alignment and back out to the same side. This creates a pulse of light to return through the fiber optic. When this pulse is detected by the detector, conventional circuitry can change the light 10 from "on" to "off", "off" to "on" or change brightness by one step. Using a pulse of light is advantageous, since light from several switches can be combined, allowing a multiplicity of switches to control a single light or other appliance. Individual optical fibers 24 may run from each of the switches to the single detector, or fibers from several switches may be combined into a single fiber running to the detector.

In another embodiment, the switch could turn light 10 "on" when the reflector is moved to the reflecting position or when moved to prevent reflection, with "off" being the opposite position.

FIG. 2 shows a second schematic switch and electrical device system, here intended for new construction. A light fixture, typically a ceiling light is wired to 120 volt power. A switch 34, which could be surface mounted, includes an actuator 36, here of the lever type, rigidly attached to the reflector within the thin housing 38 for moving the reflector into and out of alignment with the end of an optical fiber 40 secured to the intervening wall by tape 42 (which, in new construction could run within the wall) and running to light 30. The light emitter and light detector, as detailed below, are located within lamp base 44 and control the lamp on-off cycle in accordance with the position of the reflector at switch 34, using conventional circuitry.

The system shown in FIG. 2 is also inexpensive when used in remodeling existing construction, since it can easily be installed without having to fish wires through walls and no junction box and hard wiring is required. Often, the ceiling light is located in an unfloored attic, providing easy access to install the light. This is a very safe system, since there are no shock or explosion hazards at the switch and no electrical hazards if fiber optic 40 should be damaged, cut or contacted with metal objects, such as nails or becomes wet. Additional optical switches 36 could be easily installed, as shown in FIG. 1.

The fiber optic signal system is schematically shown in FIG. 3. The optical fiber 50, which is a single fiber or very small bundle, extends from the power source, e.g. lamp or existing hard-wired switch, to the new switch containing a retro-reflector 52, preferably small flat panel bearing a plurality of very small, closely spaced spherical lens based or cube-corner based retroreflectors, making up retroreflector 52. Light is directed into fiber 50 by a conventional emitter 56, typically a light emitting diode (or the other light sources mentioned above), passes through fiber 50 to retroreflector 52 and (if retroreflector 52 is near the end of fiber 50) is returned through the same fiber to a conventional detector 58. The retroreflector 52 material is available from the 3M Company, as cube corner material or spherical lens material under the Scotch-Lite brand on sheet or fabric material, with or without a covering matrix.

While the stepped end 60 of fiber 50 is effective, if desired, a standard fiber optic coupler may be used to divide fiber 50 at the emitter/detector end to provide full fiber width for each of these elements. In many cases the preferred arrangement uses emitter 56 and detector 58 side by side in contact with each other or stacked one over the other, with the fiber bundle aligned with the intersection between emitter and detector, with emitter light entering one half of the bundle and the detector receiving light through the other half of the bundle.

Retroreflector 52 is mounted on a post 62 fastened to the switch actuator. When the switch is actuated, post 62 moves reflector 52 past the end of fiber 50, so that a pulse of light is reflected to detector 58. Retroreflector 52 is very small and only slight movement is required to move it past from the axis of fiber 50. The retroreflector does not have to be precisely aligned with the end of fiber 50 to be effective, as would be the case with a flat or curved reflector. The retroreflector is very efficient, typically reflecting at least about 50% of the incident light back along the original axis. Even if slightly out of the precisely aligned position, this reflector remains fully effective so long as light leaving the fiber enters the reflector.

Any suitable emitter and detector may be used. Typical emitters include those available from the Siemans company under the designations SFH 450, SFH 750 and others and Motorola under the LED 76 designation and others. Typical detectors include phototransistors such as the SFH 350 and PIN photodiodes such as the SFH250 from Siemans and various photo-Darlington hybrids from Motorola. Appropriate circuits for operating the emitters and detectors and controlling devices, such as lamps, in response to the detectors are available from a variety of sources, such as the Motorola MOS/NMOS Special Functions Data Book, published in 1988.

Other applications, variations and ramifications of this invention will occur to those skilled in the art upon reading this disclosure. Those are intended to be included within the scope of this invention, as defined in the appended claims.

We claim:

1. A remote fiber optic switch system for controlling an electrical device which comprises:
   a single optical fiber adapted to extend from a first remote location to a second location at an electrical device to be switched between on and off states;
   an emitter at said second location adapted to introduce light into said optical fiber;
   a detector at said second location adapted to receive light from said optical fiber;
   an optical switch assembly comprising a self-aligning retroreflector at said first location and means for moving said retroreflector into and out of a first position for reflecting a high percentage of the light emitted by said fiber back into said fiber to said detector and a second position for preventing reflection of light emitted by said fiber back into said fiber; and
   means for changing the operating state of said electrical device in response to the receipt of light at said detector.

2. The fiber optic switch according to claim 1 wherein said means for moving said retroreflector includes means for continuously moving said retroreflector from a first position preventing reflection of light emitted from the fiber back into said fiber, through a second position aligned with the fiber end for reflecting light emitted by said fiber back into said fiber to said detector and a third position preventing reflection of the light emitted by said fiber back into said fiber whereby a pulse of light passes back through said fiber to said detector while said retroreflector is aligned with said fiber end.

3. The fiber optic switch according to claim 2 further including a plurality of optical fibers extending from said detector to a plurality of said switches, each comprising one of said retroreflectors and associated means for moving said reflectors, whereby any of said switches can change the state of said electrical device.

4. The fiber optic switch according to claim 1 wherein said retroreflector is a sheet bearing a plurality of small retroreflecting areas, said areas comprising spherical lens retroreflectors.

5. The fiber optic switch according to claim 1 wherein said fiber is axially bonded to a length of tape adapted to be bonded to a wall surface between said switch and device being controlled.

6. The fiber optic switch according to claim 1 wherein said electrical device is a mechanical manual switch connected to an additional electrical device spaced from said mechanical switch, and includes means permitting either said fiber optic switch or said mechanical switch to control said additional electrical device.

7. The fiber optic switch according to claim 1 further including at least one fiber optic coupler connecting at least one additional optical fiber to said optical fiber, and an additional optical switch connected to each additional optical fiber.

8. The fiber optic switch according to claim 1 wherein said emitter is a light emitting diode.

9. The fiber optic switch according to claim 1 further including a fiber optic coupler at said second location for coupling two fibers to said single fiber, one optically connected to said emitter and the other optically connected to said detector.

10. The fiber optic switch according to claim 7 wherein said single optical fiber includes a plurality of substantially parallel fibers, which carry the emitter signal to said switch and which carry the return signal to said detector.

11. The fiber optic switch according to claim 1 wherein said fiber optic comprises a bundle of individual fibers, said bundle being divided at said first location, with a first portion of said bundle aligned with said detector and the remaining portion of said bundle aligned with said detector.

12. The fiber optic switch according to claim 1 wherein said emitter and detector are abutting along a line, with the end of said fiber aligned with said line, so that about half of the fiber is operatively engaged with each of said emitter and detector.

13. The fiber optic switch according to claim 1 wherein said optical fiber has a diameter of from about 0.003 to 0.10 inch.

14. The fiber optic switch according to claim 1 wherein said retroreflector is a sheet bearing a plurality of small retroreflecting areas, said areas comprising cube-corner retroreflectors.

15. A remote fiber optic switch system for controlling an electrical device which comprises:
a single optical fiber adapted to extend from a first remote location to a second location at an electrical device to be switched between on and off states;
an emitter at said second location adapted to introduce light into said optical fiber;
a detector as said second location adapted to receive light from said optical fiber;
an optical switch assembly comprising:
a self-aligning retroreflector at said first location;
and means for continuously moving said retroreflector from a first position preventing reflection of light emitted from said fiber back into said fiber, through a second position aligned with said fiber end for reflecting light emitted by said fiber back into said fiber to said detector and a third position preventing reflection of the light emitted by said fiber back into said fiber;
whereby a pulse of light is passed back through said fiber to said detector while said retroreflector is aligned with said fiber end; and
means for changing the operating state of said electrical device in response to the receipt of said light pulse at said detector.

16. The fiber optic switch according to claim 15 wherein said retroreflector is a sheet bearing a plurality of small retroreflecting areas, said areas comprising retroreflectors selected from the group consisting of cube-corner retroreflectors and spherical lens retroreflectors.

17. The fiber optic switch according to claim 15 wherein said fiber is axially bonded to a length of tape adapted to be bonded to a wall surface between said switch and device being controlled.

18. The fiber optic switch according to claim 15 wherein said electrical device is a mechanical manual switch connected to an additional electrical device spaced from said mechanical switch, and includes means permitting either said fiber optic switch or said mechanical switch to control said additional electrical device.

19. The fiber optic switch according to claim 15, further including at least one fiber optic coupler connecting at least one additional optical fiber to said optical fiber, and an additional optical switch connected to each additional optical fiber.

20. The fiber optic switch according to claim 15 wherein said emitter is a light emitting diode.

21. The fiber optic switch according to claim 15 further including a fiber optic coupler at said second location for coupling two fibers to said single fiber, one optically connected to said emitter and the other optically connected to said detector.

22. The fiber optic switch according to claim 21 wherein said single optical fiber includes a plurality of substantially parallel fibers, which carry the emitter signal to said switch and which carry the return signal to said detector.

23. The fiber optic switch according to claim 15 wherein said fiber optic comprises a bundle of individual fibers, said bundle being divided at said first location, with a first portion of said bundle aligned with said detector and the remaining portion of said bundle aligned with said detector.

24. The fiber optic switch according to claim 15 wherein said emitter and detector are abutting along a line, with the end of said fiber aligned with said line, so that about half of the fiber is operatively engaged with each of said emitter and detector.

25. The fiber optic switch according to claim 15 wherein said optical fiber has a diameter of from about 0.003 to 0.10 inch.

* * * * *